US010670620B2

(12) United States Patent
Belz et al.

(10) Patent No.: US 10,670,620 B2
(45) Date of Patent: Jun. 2, 2020

(54) PIPETTING DEVICE AND PIPETTING DEVICE POSITIONING SYSTEM

(71) Applicant: Roche Diagnostics Operations, Inc., Indianapolis, IN (US)

(72) Inventors: Renato Belz, Rothenburg (CH); Armin Bucher, Neuenkirch (CH); Reto Joho, Villmergen (CH); Maximilian Mizelli, Ried im Traunkreis (AT); Tamara Melanie Wagner, Kremsmuenster (CH); Markus Rudolf Riepl, Garsten Rosenegg (AT); Thomas Koeppen, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 16/157,763

(22) Filed: Oct. 11, 2018

(65) Prior Publication Data
US 2019/0120869 A1    Apr. 25, 2019

(30) Foreign Application Priority Data
Oct. 24, 2017  (EP) .................................. 17197939

(51) Int. Cl.
*G01N 35/10*  (2006.01)
*G01N 35/04*  (2006.01)
*B01L 3/00*   (2006.01)

(52) U.S. Cl.
CPC ...... *G01N 35/1011* (2013.01); *B01L 3/50825* (2013.01); *G01N 35/04* (2013.01);
(Continued)

(58) Field of Classification Search
CPC ............... G01N 35/1011; G01N 35/04; G01N 2035/0405; G01N 2035/0474;
(Continued)

(56) References Cited

U.S. PATENT DOCUMENTS

| 4,515,752 | A | 5/1985 | Miramanda |
| 5,297,599 | A | 3/1994 | Bucheli |

(Continued)

FOREIGN PATENT DOCUMENTS

| EP | 1995182 A1 | 11/2008 |
| EP | 2423688 A1 | 2/2012 |

(Continued)

*Primary Examiner* — Suman K Nath
(74) *Attorney, Agent, or Firm* — Roche Diagnostics Operations, Inc.

(57) ABSTRACT

A pipetting device comprising a head and a nozzle with a longitudinal axis mounted to the head is disclosed. An actuator member is arranged around and partially covering the nozzle and coupled to the head or to the nozzle. The actuator member and the nozzle move with respect to each other along the longitudinal axis. A contact member is coupled to and arranged around and partially covering the actuator member. The contact member and the actuator member move with respect to each other. The contact member comprises a rim for contacting a container. The actuator member comprises a rim for opening a cap of the container when the contact member is in contact with the container. The actuator member and the contact member move with respect to each other creating a passage through the cap when the nozzle and the actuator member move with respect to each other.

15 Claims, 6 Drawing Sheets

(52) U.S. Cl.
CPC ......... *B01L 3/523* (2013.01); *B01L 2300/042* (2013.01); *B01L 2300/043* (2013.01); *G01N 2035/0405* (2013.01)

(58) Field of Classification Search
CPC ......... G01N 2035/1039; B01L 3/50825; B01L 3/523; B01L 3/0293; B01L 3/0217; B01L 3/0227; B01L 3/0275; B01L 3/021; B01L 3/02; B01L 3/0203; B01L 2200/148; B01L 2200/141; B01L 2200/023; B01L 2200/146; B01L 2400/0478; B01L 2400/0481; B01L 2300/042; B01L 2300/043
USPC ..... 73/1.74, 863.32, 864.23, 864.24, 864.83; 422/501, 502, 504, 505, 516, 922, 923
See application file for complete search history.

(56) References Cited

U.S. PATENT DOCUMENTS

| | | | |
|---|---|---|---|
| 7,666,357 | B2 | 2/2010 | Sather et al. |
| 9,174,779 | B2 | 11/2015 | Boeckeler |
| 2004/0067169 | A1 | 4/2004 | Krause |
| 2013/0121882 | A1 | 5/2013 | Kimura et al. |
| 2014/0011292 | A1 | 1/2014 | Lentz et al. |
| 2014/0330216 | A1* | 11/2014 | Weaver ............ A61M 5/31513 604/198 |
| 2015/0224497 | A1 | 8/2015 | Furrer et al. |

FOREIGN PATENT DOCUMENTS

| | | |
|---|---|---|
| EP | 2617657 A1 | 7/2013 |
| JP | S59638 A | 1/1984 |
| WO | 2011/101588 A1 | 8/2011 |

* cited by examiner

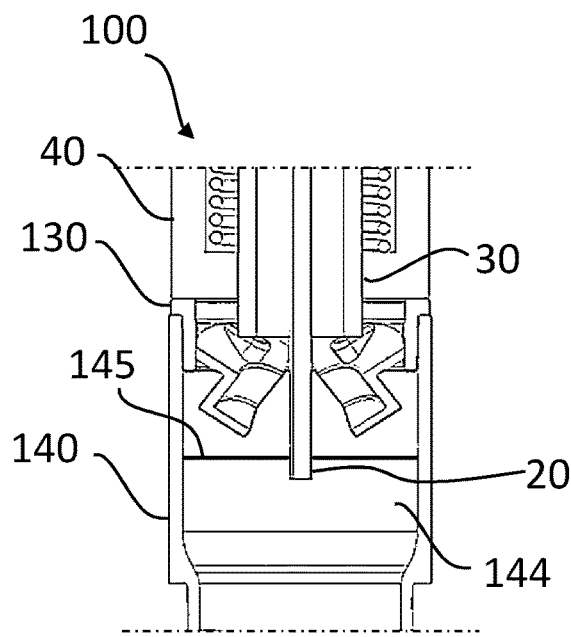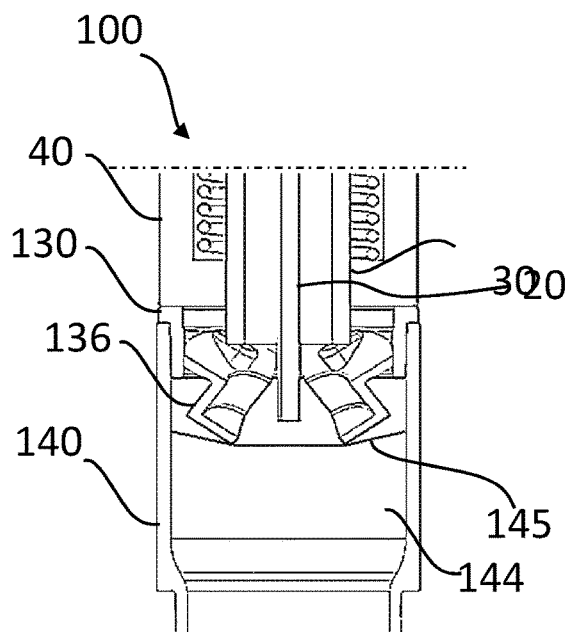
Fig. 7  Fig. 8
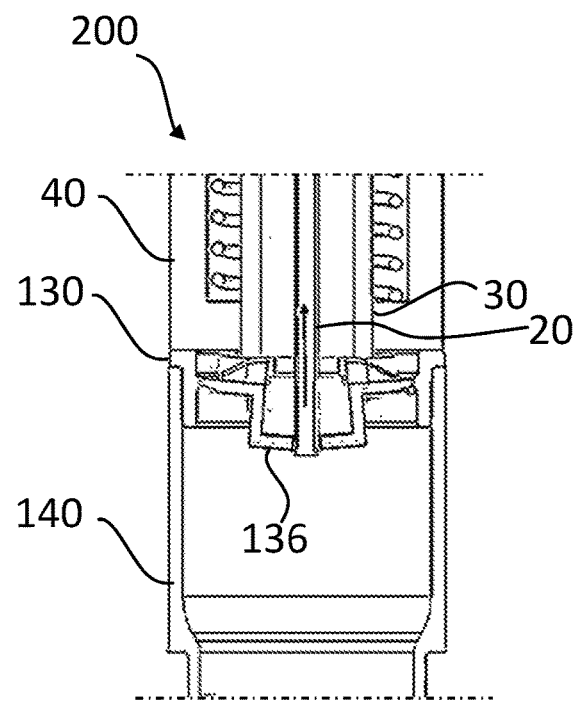
Fig. 9

PIPETTING DEVICE AND PIPETTING DEVICE POSITIONING SYSTEM

CROSS-REFERENCE TO RELATED APPLICATIONS

This application claims priority to EP 17197939.6, filed Oct. 24, 2017, which is hereby incorporated by reference.

BACKGROUND

The present disclosure relates to an automated pipetting device, to a pipetting device positioning system comprising the pipetting device and to an in-vitro diagnostic system comprising the pipetting device positioning system.

Typical workflows in automated in vitro diagnostic systems comprise pipetting, i.e., aspirating and/or dispensing liquids, such as samples and reagents, from and/or into liquid containers, involving the use of automated pipetting devices.

An automated pipetting device normally comprises a pipette nozzle. The pipette nozzle, depending on the application, e.g., in case of susceptibility to carry-over, may comprise a reusable needle or a consumable tip.

Depending on the application, liquid containers may be loaded open or closed into an in-vitro diagnostic system. Mostly, reagent containers are closed by a cap in order to increase onboard stability by preventing evaporation, contamination and interference by external factors. Sample containers may be loaded open or closed, also depending on the application.

With closed liquid containers, pipetting of liquids contained therein becomes more complicated. Caps need to be at least temporarily removed in order to enable access of a pipette nozzle to the liquid contained therein, especially if consumable tips instead of needles are used. Opening and closing liquid containers may be technically complicated, bulky and costly if automated.

As an alternative, caps may be configured to enable a pipette nozzle, particularly a pipette needle, to access the liquid in the liquid container through the cap. Elastomeric caps may be, for example, pierced, either directly by the pipette needle or by a dedicated piercer before inserting the pipette needle. Pre-cut sections in the caps are sometimes also used in order to facilitate insertion of a pipette nozzle whereas upon removal of the pipette nozzle the cap is resiliently reclosed by itself. Pipetting through a cap has however several disadvantages. One disadvantage is that contact of the pipette nozzle with the cap can cause cross-contamination. Also, the risk of damaging the pipette nozzle is increased. Also, most techniques for detecting a level of the liquid in the liquid container, e.g., based on capacitance measurement, are hindered by the presence of a cap and/or possible traces of liquid present on the cap.

Another general problem associated with pipetting devices is a chain of mechanical and geometrical tolerances in the vertical direction. In particular, tolerances in the assembly of the pipetting device, including manual or automated coupling of the pipette nozzle, tolerances in the driving mechanism for translating the pipetting device in the vertical direction, manufacturing tolerances with respect to the dimensions of the liquid container, positioning of the liquid container within the in-vitro diagnostic system in possibly different liquid container holding positions, can result in an even larger cumulative tolerance and therefore in a relatively large imprecision in the vertical positioning of a pipette nozzle with respect to the liquid container, in particular with respect to the bottom of the liquid container.

In particular, as the liquid in the liquid container is used up and the level of liquid decreases, it is desirable to be able to position the pipette nozzle as close as possible to the bottom of the liquid container in order to minimize the dead volume.

However, because of the imprecision in the positioning of the pipette nozzle, a safety distance from the bottom of the container is maintained in order to prevent a crash of the pipette nozzle with the bottom of the liquid container, which could result in an incorrect pipetting, a damage of the pipette nozzle and/or of the liquid container and the like. As a consequence, the dead volume, i.e., the amount of liquid remaining at the bottom of the liquid container that is not used and therefore wasted can be significantly high, e.g., up to 10% of the entire liquid volume, or even more, especially for smaller liquid containers, e.g., below 20-30 mL.

SUMMARY

According to the present disclosure, an automated pipetting device is presented. The pipetting device can comprise a pipette head and a pipette nozzle mounted to the pipette head. The pipette nozzle can have a longitudinal axis. The pipetting device can also comprise a hollow actuator member concentrically arranged with respect to the longitudinal axis around the pipette nozzle and at least partially covering the pipette nozzle and movably coupled to the pipette head or to the pipette nozzle so that the actuator member and the pipette nozzle are movable with respect to each other along the longitudinal axis and a hollow contact member concentrically arranged with respect to the longitudinal axis around the actuator member and at least partially covering the actuator member and movably coupled to the actuator member so that the contact member and the actuator member are movable with respect to each other along the longitudinal axis. The contact member can comprise a contact rim for contacting a liquid container. The actuator member can comprise an actuator rim for opening a cap of the liquid container when the contact member is in contact with the liquid container. The actuator member and the contact member can be moved with respect to each other creating a contact-free passage for the pipette nozzle through the cap when the pipette nozzle and the actuator member are moved with respect to each other.

In accordance with one embodiment of the present disclosure, a pipetting device positioning system is also presented. The pipetting device positioning system can comprise an automated pipetting device as described above, a liquid container comprising a longitudinal body comprising a bottom and an upper opening and an inner space between the upper opening and the bottom for receiving a liquid, a driving unit for moving the pipetting device and/or the liquid container with respect to each other, and a controller for controlling the driving unit such as to position the pipette nozzle to a desired position with respect to the liquid container.

Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 7 illustrates an embodiment in connection to the use of the pipetting device of FIG. 1 for opening a liquid container according to an embodiment of the present disclosure.

FIG. 8 illustrates a variant of the embodiment of FIG. 7 according to an embodiment of the present disclosure.

FIG. 9 illustrates another method of using the pipetting device positioning system of FIG. 3 according to an embodiment of the present disclosure.

DETAILED DESCRIPTION

Figure 1:
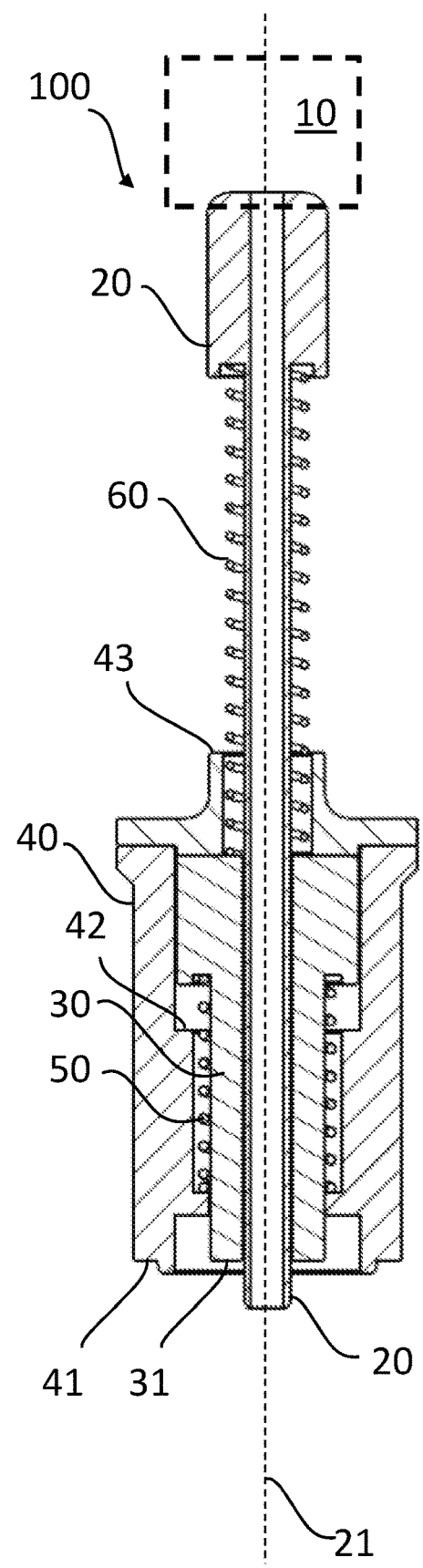
FIG. 1 illustrates an automated pipetting device according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

An automated pipetting device is herein disclosed. The pipetting device can comprise a pipette head and a pipette nozzle mounted to the pipette head, the pipette nozzle having a longitudinal axis. The pipetting device can further comprise a hollow actuator member concentrically arranged with respect to the longitudinal axis around the pipette nozzle and at least partially covering the pipette nozzle. The actuator member can be movably coupled to the pipette head or to the pipette nozzle so that the actuator member and the pipette nozzle can be movable with respect to each other along the longitudinal axis. The pipetting device can further comprise a hollow contact member concentrically arranged with respect to the longitudinal axis around the actuator member and at least partially covering the actuator member. The contact member can be movably coupled to the actuator member so that the contact member and the actuator member can be movable with respect to each other along the longitudinal axis. The contact member can comprise a contact rim for contacting a liquid container. The actuator member can comprise an actuator rim for opening a cap of the liquid container when the contact member is in contact with the liquid container and the actuator member and the contact member can be moved with respect to each other, thereby, creating a contact-free passage for the pipette nozzle through the cap when the pipette nozzle and the actuator member are moved with respect to each other.

A pipetting device positioning system comprising such pipetting device is herein also disclosed. The pipetting device positioning system can further comprise a liquid container comprising a longitudinal body comprising a bottom and an upper opening and an inner space between the upper opening and the bottom for receiving a liquid. The pipetting device positioning system can further comprise a driving unit for moving the pipetting device and/or the liquid container with respect to each other. The pipetting device positioning system can further comprise a controller for controlling the driving unit such as to position the pipette nozzle to a desired position with respect to the liquid container.

An in-vitro diagnostic system comprising such pipetting device positioning system is herein also disclosed.

By contacting the liquid container with the contact member and by regulating the position of the pipette nozzle with respect to the contact member when the contact member is in contact with the liquid container, a higher precision in the positioning of the pipette nozzle can be achieved reducing the safety distance from the bottom of the liquid container and minimizing the dead volume. By creating a contact-free passage for the pipette nozzle with the actuator member through the cap of the liquid container, if closed by a cap, the risk of carry-over can be minimized and interference with liquid level detection techniques can be eliminated. Also, both reusable needles and consumable tips may be equally used. Moreover, regardless of the use of a cap for closing a liquid container, the use of a hollow actuator member at least partially covering the pipette nozzle until moved with respect to each other can minimize the risk of accidents and injuries when the pipette nozzle is moved.

Another advantage can be that all these effects can be achieved by a simple, compact and inexpensive construction, possibly requiring only one driver for moving the pipetting device along the longitudinal axis.

An "in vitro diagnostic system" can be a laboratory automated apparatus dedicated to the analysis of samples for in vitro diagnostic. The in vitro diagnostic system may have different configurations according to the need and/or according to the desired laboratory workflow. Additional configurations may be obtained by coupling a plurality of apparatuses and/or modules together. A "module" can be a work cell, typically smaller in size than the entire in vitro diagnostic system, which can have a dedicated function. This function can be analytical but can be also pre-analytical or post analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps. Thus the in vitro diagnostic system may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative, pre-analytical and/or post-analytical functions may be performed by units integrated in an analytical apparatus. The in vitro diagnostic system can comprise functional units such as liquid handling units for pipetting and/or pumping and/or mixing of samples and/or reagents and/or system fluids and also functional units for loading, unloading, sorting, storing, transporting, identifying, separating, and detecting.

An "automated pipetting device" can be a functional unit of an in-vitro diagnostic system for pipetting, i.e., aspirating and/or dispensing, liquids, comprising for this purpose at least one pipette head and at least one pipette nozzle mounted to the pipette head. According to certain embodiments, the pipette head can be moved in one, two or three directions of travel. For example, it may be rotated or translated in a horizontal plane, e.g., along guiding rails, and may be translated in a vertical direction of travel orthogonal to the plane. The pipette head may comprise or may be coupled via a fluidic conduct to a pump mechanism for generating a negative and/or positive pressure for aspirating and dispensing liquids through the pipette nozzle respectively. The pipette head may comprise other elements such as the electronics for communicating with the in-vitro diagnostic system, driving units for moving the pipette head and/or the pipette nozzle, one or more sensors, e.g., a pressure sensor for detecting clogging of the pipette nozzle or presence of air in the pipette nozzle, a temperature sensor for measuring the temperature of a liquid in the pipette nozzle or liquid container, a liquid level sensor for detecting the level of a liquid in a liquid container, and the like. Additional units may be mounted to the pipette head apart from the pipette nozzle like for example a gripper for gripping and transporting consumables, e.g., reaction vessels within the in-vitro diagnostic system.

The term "pipette nozzle" can herein be used to mean a terminal hollow component of the fluidic conduit of the pipetting device mounted to the pipette head and configured to come into contact with a liquid in a liquid container and dimensioned such as to be able to aspirate and contain an aliquot of the liquid in a predefined volume range. In particular, the pipette nozzle can be a reusable washable needle, e.g., a steel hollow needle, or a pipette tip, e.g., a disposable pipette tip that can be configured to be regularly replaced, for example, before pipetting a different liquid.

The pipette nozzle can have a longitudinal axis that can be substantially parallel to the vertical direction (direction of gravity) when the pipette nozzle is mounted to the pipette head.

The term "mounted to" can herein be used to mean fixedly or removably attached or connected to and in a possibly fixed relative arrangement with respect to each other regardless of the relative position of the pipetting device with respect to a liquid container.

The term "movably coupled to" can herein be used to mean fixedly or removably attached or connected to and in a variable relative arrangement with respect to each other depending on the relative position of the pipetting device with respect to a liquid container.

An "actuator member" can be a tool having a rigid longitudinal structure and a hollow inner space, dimensioned as a channel slightly larger than the pipette nozzle, for the pipette nozzle to be able to pass through. In particular, the actuator member can be concentrically arranged with respect to the longitudinal axis around the pipette nozzle and at least partially covering the pipette nozzle, i.e., covering at least a longitudinal segment of the pipette nozzle. In particular, the actuator member may have the function of cover or protection of at least an extremity of the pipette nozzle such as to prevent possible injuries or contact with other parts if the pipetting device is moved around within the in-vitro diagnostic system. The actuator member can be movably coupled to the pipette head or to the pipette nozzle so that the actuator member and the pipette nozzle can be movable with respect to each other along the longitudinal axis. In this way, at least the extremity of the pipette nozzle can be extended out of the actuator member for accessing the liquid in a liquid container or dispensing a liquid into a liquid container while the actuator member is left behind. Another important function of the actuator member may be, however, that of cap opener in the case where the liquid container is closed by a cap such as to create a contact-free passage for the pipette nozzle through the cap when the pipette nozzle and the actuator member are moved with respect to each other. In this way, the risk of carry-over and/or the risk of damaging the pipette nozzle can be minimized and the interference of the cap with eventual sensors can be eliminated.

A "contact member" can be another tool having a rigid longitudinal structure and a hollow inner space, dimensioned as a channel slightly larger than the actuator member, for the actuator member to be able to pass through. In particular, the contact member can be concentrically arranged with respect to the longitudinal axis around the actuator member and at least partially covering the actuator member, i.e., covering at least a longitudinal segment of the actuator member. The contact member can be movably coupled to the actuator member so that the contact member and the actuator member can be movable with respect to each other along the longitudinal axis. In this way, at least an extremity of the actuator member can be extended out of the contact member for opening a cap of a liquid container while the contact member is left behind. Particularly, the function of the contact member can be to come in contact with the liquid container and to remain in a relative fixed position with respect to the liquid container, e.g., by holding down and steady the liquid container, while the actuator member and the pipette nozzle can move with respect to the liquid container.

More in particular, the contact member can comprise a contact rim at a lowermost extremity of the contact member concentrically arranged with respect to the longitudinal axis and dimensioned such as to at least in part contact and possibly match an upper surface of a liquid container, specifically an upper and outer rim of an upper opening of the liquid container or an upper and outer rim of a cap closing the liquid container upon moving the pipetting device and/or the liquid container relative to each other in the direction of and centrally aligned with the longitudinal axis of the pipette nozzle. The shape of the contact rim can be, according to an embodiment, circular such as to match a circular upper shape of a liquid container or liquid container cap. Also, the actuator member can comprise an actuator rim at a lowermost extremity of the actuator member concentrically arranged with respect to the longitudinal axis and dimensioned such as to at least in part contact and apply a pressure onto an upper and central surface of a cap of the liquid container when the contact member is in contact with the liquid container and the actuator member and the contact member can be moved with respect to each other thereby pushing a central portion of the cap towards the inside of the liquid container and radially outwards with respect to the longitudinal axis thereby creating a contact-free passage for the pipette nozzle through the cap when the pipette nozzle and the actuator member are moved with respect to each other. The shape of the actuator rim can also be, according to an embodiment, circular such as to match a circular upper shape of a central portion of a cap.

The term "movable with respect to each other," with reference to any pair of elements or members, can encompass the possibility that any of the members or elements of the pair can be moved towards the other or away from the other or that both elements or members can be moved towards each other or away from each other. The movable members or elements may particularly include the pipetting device, the pipette head, the pipette nozzle, the actuator member, the contact member, and/or the liquid container.

According to an embodiment, the pipetting device can comprise a contact member/actuator member stop for providing a moving limit along the longitudinal axis to the contact member and the actuator member with respect to each other.

According to an embodiment, the pipetting device can comprise a contact member/pipette nozzle stop or a pipette nozzle/actuator member stop for providing a moving limit along the longitudinal axis to the contact member and the pipette nozzle with respect to each other and/or to the actuator member and the pipette nozzle with respect to each other.

The stops can be geometrical stops located at predefined positions of e.g., any one or more of the contact member, the actuator member, and/or the pipette nozzle.

According to an embodiment, the pipetting device can comprise a contact member resilient element for resiliently coupling the contact member to the actuator member and an actuator member resilient element for resiliently coupling the actuator member to the pipette nozzle or pipette head, where the actuator member resilient element can have a resilient force greater than the resilient force of the contact member resilient element.

The contact member resilient element and the actuator member resilient element may be, for example, different compression springs.

Thus, moving of the contact member and actuator member with respect to each other and moving of the actuator member and pipette nozzle with respect to each may be obtained by a single relative movement of the pipetting device with respect to the liquid container, e.g., by moving the pipetting device along the longitudinal axis of the pipette nozzle towards an upright liquid container centrally aligned with the longitudinal axis until the contact member touches the upper side of the liquid container, then by moving further the pipetting device against the resilient force of the contact member resilient element until the actuator member reaches the contact member/actuator member stop, then by moving further the pipetting device against the resilient force of the actuator member resilient element until the pipette nozzle reaches the contact member/pipette nozzle stop or the pipette nozzle/actuator member stop.

Analogously, by moving the pipetting device in the opposite direction, the pipette nozzle can be brought back in the original relative position with respect to the actuator member before the actuator member is brought back in the original relative position with respect to the contact member before moving the contact member together with the pipetting device farther away from the liquid container.

The same can be achieved by moving the liquid container towards the pipetting device or the pipetting device and the liquid container simultaneously towards each other.

Alternative methods of moving the contact member and actuator member with respect to each other and moving of the actuator member and pipette nozzle with respect to each can be also implemented, for example, by a sequential screwing spindle-like mechanism or by individually motorizing the contact member and actuator member or the actuator member and the pipette nozzle.

A "pipetting device positioning system" can be a functional unit of an in-vitro diagnostic system for positioning a pipetting device with respect to a liquid container and, therefore, a pipette nozzle with respect to the liquid container or to a liquid contained in the liquid container.

Particularly, the pipetting device positioning system can comprise a pipetting device, a liquid container, a driving unit for moving the pipetting device and/or the liquid container with respect to each other and a "controller" for controlling the driving unit such as to position the pipette nozzle to a desired position with respect to the liquid container.

A "driving unit" can be a motorized driving mechanism configured to move, e.g., to translate and/or to rotate, the pipetting device and/or a liquid container with respect to each other, in at least one direction of travel and, possibly, two or three directions of travel. For example, the driving unit may be configured as an automated robotic device, e.g., a robotic arm, to which the pipette head can be mounted, and having a predefined range of movement in a three-dimensional space, including a space above a liquid container compartment, comprising one or more liquid container positions.

The driving unit may be calibrated with respect to fixed reference points of the in vitro diagnostic system such as to increase its precision of movement within such three-dimensional space. In particular, the calibrated driving unit can be taught to move to any particular coordinate within such three-dimensional space and, especially, in correspondence to and in alignment with a particular liquid container.

In particular, the driving unit may comprise a force sensor for detecting when a stop position, especially the contact member/pipette nozzle stop or the pipette nozzle/actuator member stop, has been reached in order to stop moving the pipette head or pipette nozzle further. Particularly, the driving unit can overcome the force of the actuator member resilient element in order to enable movement of the actuator member and the pipette nozzle with respect to each other and can be capable of stopping any further movement as soon as a force greater than the resilient force of the actuator member resilient element is detected as a consequence of the pipette nozzle/actuator member stop being reached. As an alternative to a force sensor, the pipette head may comprise a pipette head resilient element having a resilient force greater than the resilient force of the actuator member resilient element in order to enable movement of the actuator member and the pipette nozzle with respect to each other and that is resiliently capable of stopping by amortization any further movement of the pipette nozzle as soon as the pipette nozzle/actuator member stop has been reached. In this way, the pipette nozzle can be reproducibly positioned at a desired position with respect to the liquid container.

The term "controller" can encompass any physical or virtual processing device and, in particular, a programmable logic computer running a computer-readable program provided with instructions to perform operations in accordance with an operation plan and, in particular, associated with controlling the driving unit such as to position the pipetting device and, in particular, the pipette nozzle to a desired position with respect to a liquid container. The controller may be also configurable to control the in-vitro diagnostic system in a way that workflow(s) and workflow step(s) can be conducted by the in-vitro diagnostic system. In particular, the controller may communicate and/or cooperate with a scheduler and/or data manager in order to take into account incoming analysis orders and/or received analysis orders and a number of scheduled process operations associated with the execution of the analysis orders in order to plan pipetting operations using the pipetting device.

The "desired position" with respect to a liquid container can refer to any distance of the pipette nozzle or extremity of the pipette nozzle from a liquid container bottom that can enable liquid to be pipetted. Particularly, the desired position may vary, e.g., closer and closer to the bottom, as liquid in the liquid container is aspirated and the remaining volume of liquid in the liquid container becomes smaller.

According to an embodiment, the controller can be configured to control the driving unit such as to position the pipette nozzle to any desired distance from the bottom of the liquid container based on the relative position of the pipette nozzle with respect to the contact member when the contact member contacts the liquid container.

A "liquid container" may be any container comprising a body with a closed bottom and at least one upper opening and an inner space between the upper opening and the bottom for receiving a liquid. The upper opening may be open or closed by a cap. The container may be made of any material, like glass or any polymeric material and may have any geometry and size, including, for example, also wells of a multi-well plate. Examples of liquid containers can be sample containers, e.g., sample tubes, primary sample tubes configured to collect and transport a biological sample, or secondary tubes configured to receive aliquots from a primary tube. Other examples of liquid containers can be reagent containers configured to supply reagents to an in-vitro diagnostic analyzer, e.g., reagent vials or bottles, either as individual containers or sometimes grouped in a reagent pack, e.g., a reagent cassette comprising multiple reagent containers. Other examples of liquid containers can be reaction vessels configured to receive aliquots of samples and reagents for a reaction between a sample and one or more reagent to occur and eventually for a detection to take place. The list is however not exhaustive. Especially, liquids may be liquids other than samples or reagents, like, for example, quality controls, calibrators and the like.

According to an embodiment, the bottom of the liquid container can have a tapered or recessed shape having reduced cross-section with respect to an average cross-section of the longitudinal body. This shape of the bottom can enable the reduction of further dead volume by reducing the amount of liquid remaining below the safety distance from the bottom.

According to an embodiment, the liquid container can further comprise an elastomeric cap closing the upper opening, the cap comprising an outer cap rim comprising a contact surface to be contacted by the contact member and a central portion joined to the cap rim, the central portion comprising a cut section that can enable the central portion to be temporarily opened by the actuator member when the actuator member and the contact member are moved with respect to each other thereby creating a contact-free passage for the pipette nozzle through the cap when the pipette nozzle and the actuator member are moved with respect to each other.

According to an embodiment, the cut section can divide the central portion in at least three adjacent segments, each segment comprising an outer portion joined to the cap rim and an inner portion at a lower height relative to the outer portion and joined to the outer portion via a step portion. According to an embodiment, each segment can comprise an abutment element on the outer portion.

According to an embodiment, the outer portions or the abutment elements on the upper portions can each comprise an actuator member contact surface to be contacted by the actuator member when the actuator member and the contact member are moved with respect to each other thereby enabling the adjacent segments to be separated farther apart from each other. In addition, by limiting the contact of the actuator member to the abutment elements only and preventing direct contact of the actuator member with the cut section, the risk of contaminating the actuator member can be reduced.

According to an embodiment, the contact member/actuator member stop can be located at a position that can enable the contact member and the actuator member to be moved with respect to each other to a minimum extent that can be sufficient to create a contact-free passage for the pipette nozzle through the cap.

According to an embodiment, the contact member/pipette nozzle stop or the pipette nozzle/actuator member stop can be located at a position that can enable the pipette nozzle to be positioned at a lowermost position within a pre-defined tolerance range of distance from the bottom of the liquid container. In particular, the controller may be configured to stop the driving unit when the lowermost position is reached, e.g., by communicating with a force sensor.

According to an embodiment, the liquid container can further comprise a seal configured to be broken when the contact member and the actuator member are moved with respect to each other or when the actuator member and the pipette nozzle are moved with respect to each other. The seal may be located in the inner space of the liquid container below the cap in order to confer a gas-tight sealing to a liquid contained therein until opened for the first time. The seal may be embodied for example as a foil, e.g., comprising an aluminum layer and an inert layer.

FIG. 1 and FIG. 2 illustrate an automated pipetting device 100 and a method of using it. The automated pipetting device 100 can comprise a pipette head 10 and a pipette nozzle 20 mounted to the pipette head 10. The pipette nozzle 20 can have a longitudinal axis 21 that can be substantially parallel to the vertical direction (direction of gravity) when the pipetting device 100 is mounted in an in-vitro diagnostic system. The pipetting device 100 can further comprise a hollow actuator member 30 concentrically arranged with respect to the longitudinal axis 21 around the pipette nozzle 20 and partially covering the pipette nozzle 20. The actuator member 30 can be movably coupled to the pipette nozzle 20 so that the actuator member 30 and the pipette nozzle 20 can be movable with respect to each other along the longitudinal axis 21.

The pipetting device 100 can further comprise a hollow contact member 40 concentrically arranged with respect to the longitudinal axis 21 around the actuator member 30 and partially covering the actuator member 30. The contact member 40 can be movably coupled to the actuator member 30 so that the contact member 40 and the actuator member 30 can be movable with respect to each other along the longitudinal axis 21.

The contact member 40 can comprise a contact rim 41 for contacting a liquid container 140. The actuator member 30 can comprise an actuator rim 31 for opening a cap 130 of the liquid container 140 when the contact member 40 is in contact with the liquid container 140 and the actuator member 30 and the contact member 40 are moved with respect to each other, thereby, creating a contact-free passage 120 for the pipette nozzle 20 through the cap 130 when the pipette nozzle 20 and the actuator member 30 are moved with respect to each other.

The pipetting device 100 can further comprise a contact member/actuator member stop 42 for providing a moving limit along the longitudinal axis 21 to the contact member 40 and the actuator member 30 with respect to each other.

The contact member/actuator member stop 42 can be located at a position that can enable the contact member 40 and the actuator member 30 to be moved with respect to each other to a minimum extent that can be sufficient to create a contact-free passage 120 for the pipette nozzle 20 through the cap 130.

The pipetting device 100 can further comprise a contact member/pipette nozzle stop 43 for providing a moving limit along the longitudinal axis 21 to the contact member 40 and the pipette nozzle 20 with respect to each other and to the actuator member 30 and the pipette nozzle 20 with respect to each other.

The pipetting device 100 can further comprise a contact member resilient element 50, in this case, a compression spring, for resiliently coupling the contact member 40 to the actuator member 30 and an actuator member resilient element 60, that can be another compression spring, for resiliently coupling the actuator member 30 to the pipette nozzle 20. The actuator member resilient element 60 can have a resilient force greater than the resilient force of the contact member resilient element 50.

Figures 2A, 2B, 2C:
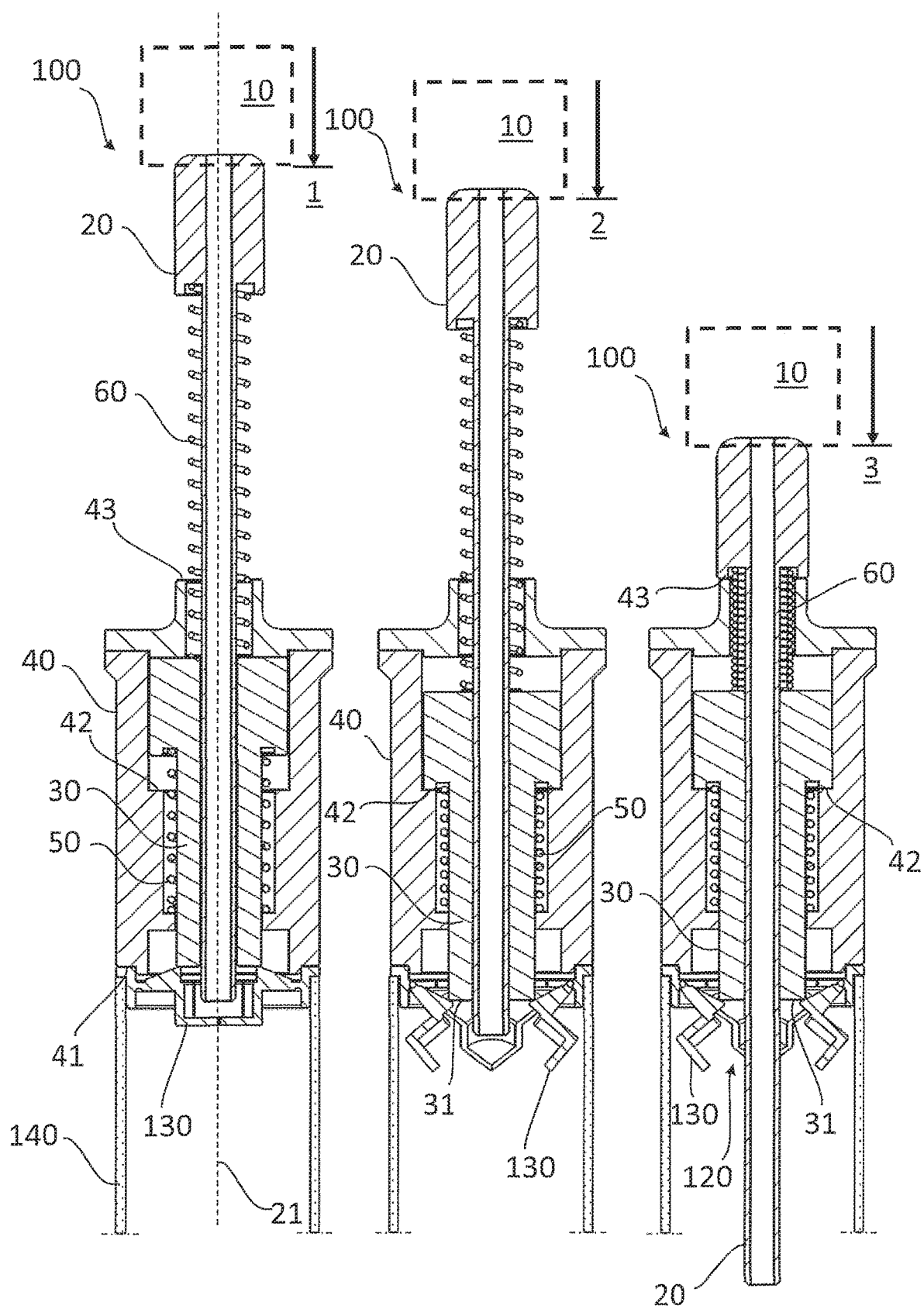
FIGS. 2A-C illustrate a method of using the automated pipetting device of FIG. 1 according to an embodiment of the present disclosure.

As can be seen in FIG. 2, moving of the contact member 40 and the actuator member 30 with respect to each other and moving of the actuator member 30 and the pipette nozzle 20 with respect to each other can be obtained by a single relative movement of the pipetting device 100 with respect to the liquid container 140, e.g., by moving the pipetting device 100 along the longitudinal axis 21 of the pipette nozzle 20 towards an upright liquid container 140 centrally aligned with the longitudinal axis 21 until the contact member 40 touches with its contact rim 41 the upper side of the liquid container 140 (FIG. 2A, position 1), then by moving further the pipetting device 100 against the resilient force of the contact member resilient element 50 until the actuator member 30 reaches the contact member/actuator member stop 42 (FIG. 2B, position 2), then by moving further the pipetting device 100 against the resilient force of the actuator member resilient element 60 until the pipette nozzle 20 reaches the contact member/pipette nozzle stop 43 (FIG. 2C, position 3).

Analogously, by moving the pipetting device 100 in the opposite direction the pipette nozzle 20 can be brought back from position 3 of FIG. 2C into the original relative position 2 of FIG. 2B with respect to the actuator member 30 before the actuator member 30 can be brought back in the original relative position 1 of FIG. 2A with respect to the contact member 40 before moving the contact member 40 together with the pipetting device 100 farther away from the liquid container 140.

Figure 3:
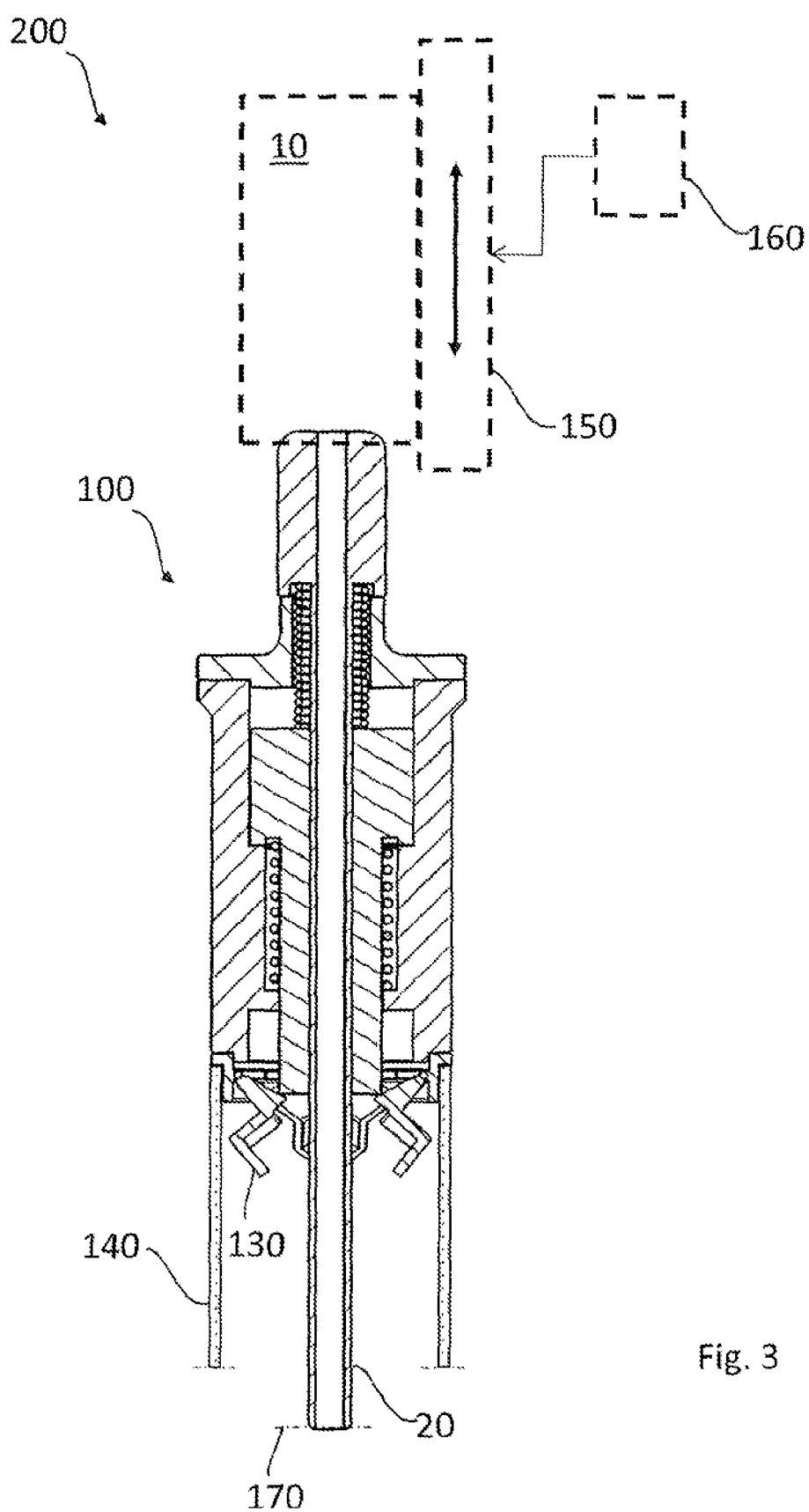
FIG. 3 illustrates a pipetting device positioning system according to an embodiment of the present disclosure.

FIG. 3 shows schematically a pipetting device positioning system 200 comprising the pipetting device 100 of FIG. 1. The pipetting device positioning system 200 can further comprise a liquid container 140, a driving unit 150 for moving the pipetting device 100 with respect to the liquid container 140, and a controller 160 for controlling the driving unit 150 such as to position the pipette nozzle 20 to a desired position 170 with respect to the liquid container 140.

Figure 4:
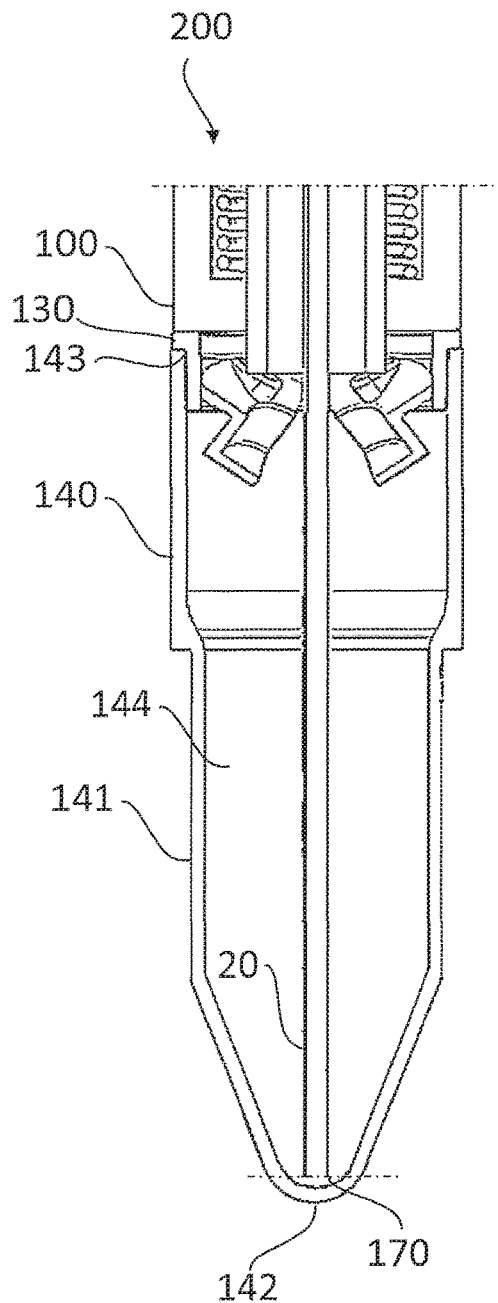
FIG. 4 illustrates positioning of a pipette nozzle with respect to a liquid container according to an embodiment of the present disclosure.

The liquid container 140, an example of which is better shown in FIG. 4, can comprise a longitudinal body 141 comprising a bottom 142 and an upper opening 143 and an inner space 144 between the upper opening 143 and the bottom 142 for receiving a liquid (not shown). The bottom 142 of the liquid container 140 can have a tapered shape having reduced cross-section with respect to an average cross-section of the longitudinal body 141. In particular, FIG. 4 illustrates how by the pipetting device positioning system 200 the pipette nozzle 20 can be positioned at a lowermost position 170 within a pre-defined tolerance range of distance from the bottom 142 of the liquid container 140. In this manner, very small dead volumes can be obtained, especially in combination with the tapered shape of the bottom 142. The controller 160 may be, however, configured to control the driving unit 150 such as to position the pipette nozzle 20 to any desired distance 170 from the bottom of the liquid container based on the relative position of the pipette nozzle 20 with respect to the contact member 40 when the contact member 40 contacts the liquid container 140.

In this example, the upper opening 143 can be closed by a cap 130.

Figure 5:
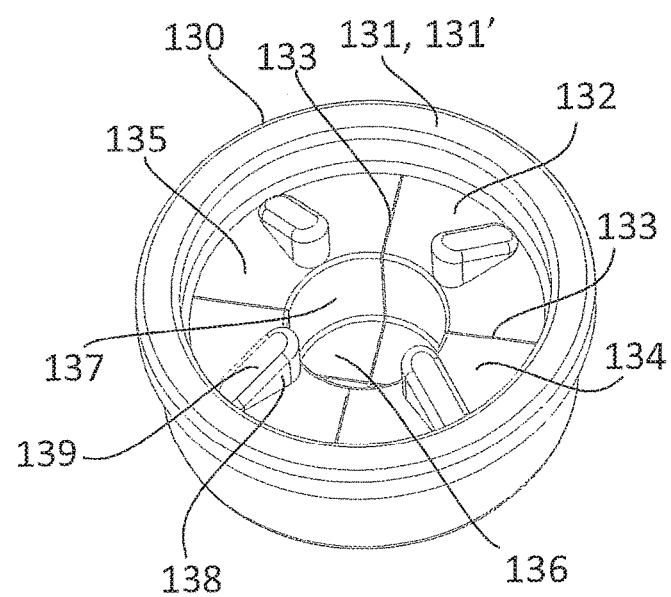
FIG. 5 illustrates an embodiment of a cap for closing a liquid container according to an embodiment of the present disclosure.
Figure 6:
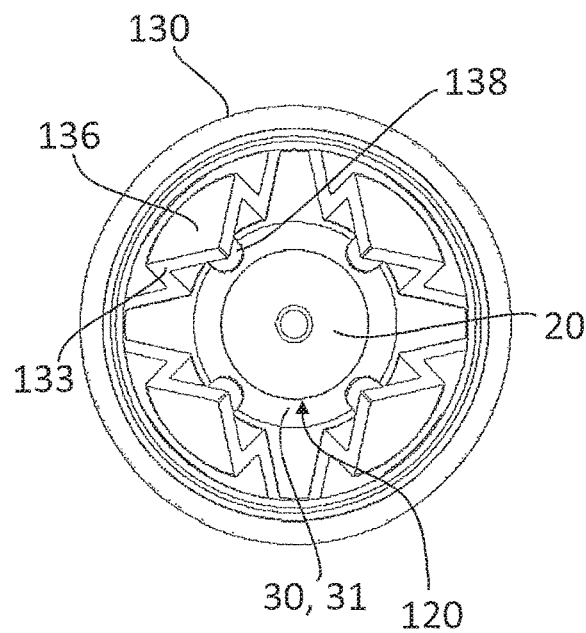
FIG. 6 illustrates the same cap of FIG. 5 from below while being opened by the pipetting device of FIG. 1 according to an embodiment of the present disclosure.

The structure of the cap 130 is elucidated in more detail in connection to FIG. 5 and FIG. 6, according to an embodiment. The cap 130 can be made of an elastomeric material acting like a stopper. The cap 130 can comprise an outer cap rim 131 comprising a contact surface 131' to be contacted by the contact member 40 and, in particular, by the contact member rim 41. The cap 130 can further comprise a central portion 132 joined to the cap rim 131, the central portion 132 comprising a cut section 133 that can enable the central portion 132 to be temporarily opened by the actuator member 30 and, particularly, by the actuator member rim 31 (FIG. 6) when the actuator member 30 and the contact member 40 are moved with respect to each other, thereby, creating a contact-free passage 120 for the pipette nozzle 20 through the cap 130 when the pipette nozzle 20 and the actuator member 30 are moved with respect to each other. In particular, the cut section 133 can divide the central portion 132 into four adjacent segments 134, each segment 134 comprising an outer portion 135 joined to the cap rim 131 and an inner portion 136 at a lower height relative to the outer portion 135 and joined to the outer portion 135 via a step portion 137. Also, each segment 134 can comprise an abutment element 138 on the outer portion 135, the abutment elements 138 each comprising an actuator member contact surface 139 to be contacted by the actuator member rim 31 when the actuator member 30 and the contact member 40 are moved with respect to each other thereby enabling the adjacent segments 134 to be separated farther apart from each other (FIG. 6). The adjacent segments 134 can be configured to resiliently return to their original position of FIG. 5 when the actuator member 30 returns to its original relative position with respect to the contact member 40, thereby, minimizing evaporation, contamination and interferences from the external environment.

FIG. 7 and FIG. 8 illustrate embodiments in connection to the use of the pipetting device 100 of FIG. 1 for opening a liquid container 140. In particular, the liquid container 140 can further comprise a seal 145 configured to be broken when the actuator member 30 and the pipette nozzle 20 are moved with respect to each other (FIG. 7) or when the contact member 40 and the actuator member 30 are moved with respect to each other (FIG. 8). The seal 145 may be located in the inner space 144 of the liquid container 140 below the cap 130 in order to confer a gas-tight sealing to a liquid contained therein until opened for the first time. In particular, the pipette nozzle 20 may be used to break a seal 145 when the pipette nozzle 20 and the actuator member 30 are moved with respect to each other (FIG. 7) or the seal 145 may be arranged at a position that can enable the segments 136 of the cap 130 to break the seal 145 when the actuator member 30 and the contact member 40 are moved with respect to each other (FIG. 8).

FIG. 9 shows another method of using the pipetting device positioning system 200 of FIG. 3. In particular, if the cap 130 is reclosed before the pipette nozzle 20 is withdrawn from the liquid container 140, which can be achieved by moving the actuator member 30 with respect to the contact member 40 in the direction opposite to that of FIG. 2 before moving the pipette nozzle 20 with respect to the actuator member 30, the pipette nozzle 20 can come in contact with the cap 130. In this way, while the pipette nozzle 20 can be prevented from contacting the cap 130 when entering the liquid container 140, it can be enabled to contact the cap 130 when being withdrawn from the liquid container 140. An effect of this method can be that possible traces of liquid sticking to the outside of the pipette nozzle 20 after aspirating liquid from the liquid container 140 can be wiped off by the segments 136 touching the pipette nozzle 20 from the inside while the external side of the cap 130 is not contaminated, which can be important for minimizing the risk of cross-contamination and the risk of infection when handling the liquid container 140.

Figure 10:
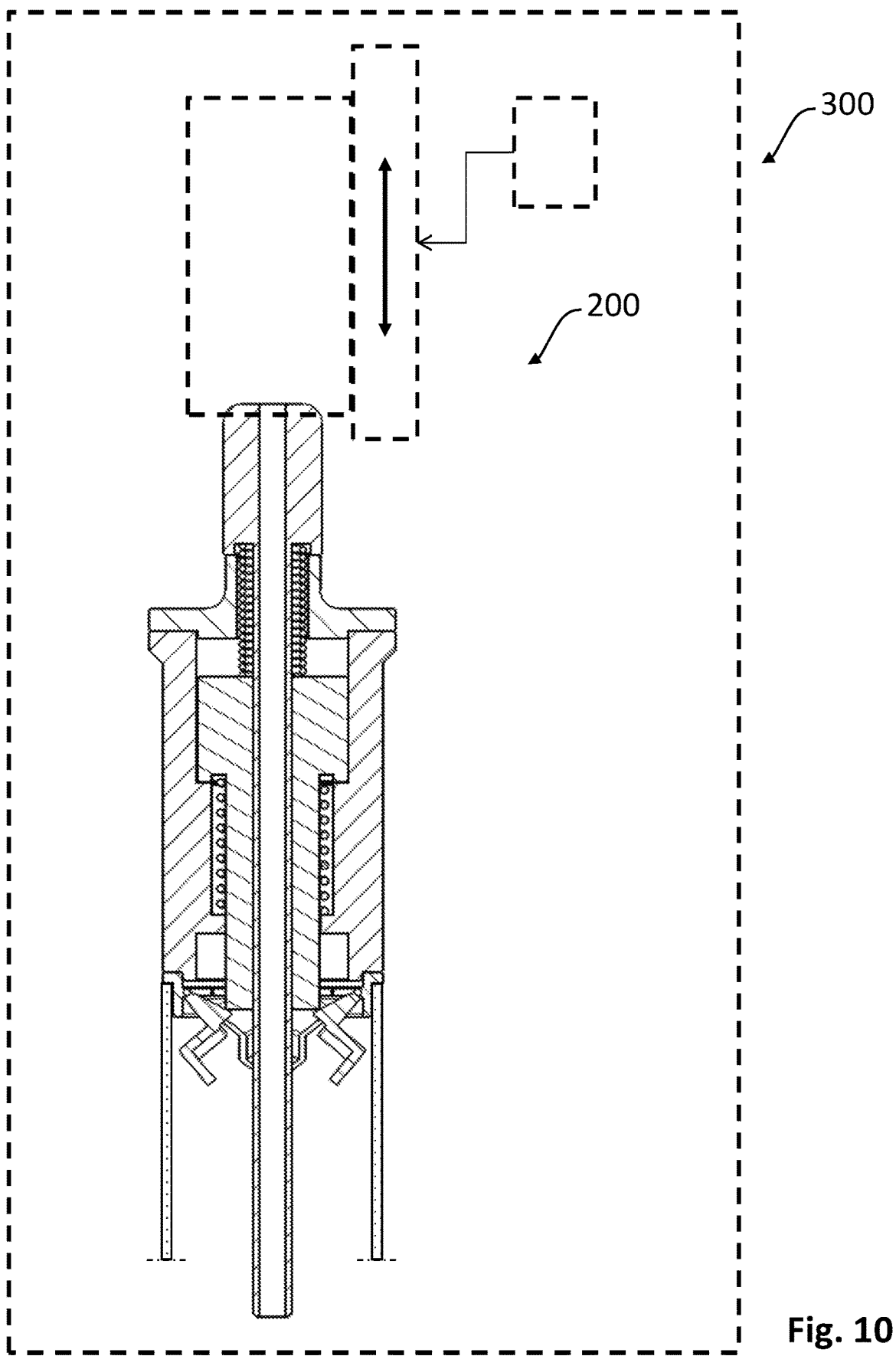
FIG. 10 illustrates an in-vitro diagnostic system according to an embodiment of the present disclosure.

FIG. 10 schematically illustrates an in-vitro diagnostic system 300 comprising the pipetting device positioning system 200 of FIG. 3.

In the preceding specification, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the present disclosure may be practiced otherwise than specifically devised in the above examples.

Reference throughout the preceding specification to "one embodiment", "an embodiment", "one example" or "an example", can mean that a particular feature, structure or characteristic described in connection with the embodiment or example is included in at least one embodiment. Thus, appearances of the phrases "in one embodiment", "in an embodiment", "one example" or "an example", in various places throughout this specification are not necessarily all referring to the same embodiment or example.

Particularly, as specified among the various advantages, although the pipetting device positioning system of the present disclosure can be suitable for creating a contact-free passage for a pipette nozzle through a cap of a liquid container, it can equally operate even in absence of a cap closing the liquid container, i.e., with open liquid containers.

Furthermore, the particular features, structures, or characteristics may be combined in any suitable combinations and/or sub-combinations in one or more embodiments or examples.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

We claim:

1. An automated pipetting device, the pipetting device comprising:
    a pipette head;
    a pipette nozzle mounted to the pipette head, the pipette nozzle having a longitudinal axis;
    a hollow actuator member concentrically arranged with respect to the longitudinal axis around the pipette nozzle and at least partially covering the pipette nozzle and movably coupled to the pipette nozzle so that the hollow actuator member and the pipette nozzle are movable with respect to each other along the longitudinal axis;
    a hollow contact member concentrically arranged with respect to the longitudinal axis around the hollow actuator member and at least partially covering the hollow actuator member and movably coupled to the hollow actuator member so that the hollow contact member and the hollow actuator member are movable with respect to each other along the longitudinal axis, wherein the hollow contact member comprises a contact rim for contacting a liquid container and wherein the hollow actuator member comprises an actuator rim for opening a cap of the liquid container when the hollow contact member is in contact with the liquid container and the hollow actuator member and the hollow contact member are moved with respect to each other creating a contact-free passage for the pipette nozzle through the cap when the pipette nozzle and the hollow actuator member are moved with respect to each other.

2. The pipetting device according to claim 1, further comprising,
    a contact member/actuator member stop for providing a moving limit along the longitudinal axis to the hollow contact member and the hollow actuator member with respect to each other.

3. The pipetting device according to claim 1, further comprising,
    a contact member/pipette nozzle stop for providing a moving limit along the longitudinal axis to the hollow contact member and the pipette nozzle with respect to each other and/or to the hollow actuator member and the pipette nozzle with respect to each other.

4. The pipetting device according to claim 1, further comprising,
    a contact member resilient element for resiliently coupling the hollow contact member to the hollow actuator member; and
    an actuator member resilient element for resiliently coupling the hollow actuator member to the pipette nozzle or pipette head, wherein the actuator member resilient element has a resilient force greater than the resilient force of the contact member resilient element.

5. A pipetting device positioning system, the pipetting device positioning system comprising:
    an automated pipetting device according to claim 1;
    a liquid container comprising a longitudinal body comprising a bottom and an upper opening and an inner space between the upper opening and the bottom for receiving a liquid;
    a driving unit for moving the pipetting device and/or the liquid container with respect to each other; and a controller for controlling the driving unit such as to position the pipette nozzle to a desired position with respect to the liquid container.

6. The pipetting device positioning system according to claim 5 wherein the liquid container further comprises an elastomeric cap closing the upper opening, the cap comprising an outer cap rim comprising a contact surface to be contacted by the hollow contact member and a central portion joined to the cap rim, the central portion comprising a cut section that enables the central portion to be temporarily opened by the hollow actuator member when the hollow actuator member and the hollow contact member are moved with respect to each other thereby creating a contact-free passage for the pipette nozzle through the cap when the pipette nozzle and the hollow actuator member are moved with respect to each other.

7. The pipetting device positioning system according to claim 6, wherein the cut section divides the central portion in at least three adjacent segments, each of the at least three adjacent segments comprising an outer portion joined to the cap rim and an inner portion at a lower height relative to the outer portion and joined to the outer portion via a step portion.

8. The pipetting device positioning system according to claim 7, wherein each of the at least three adjacent segments comprises an abutment element on the outer portion.

9. The pipetting device positioning system according to claim 7, wherein the outer portions or the abutment elements on the upper portions each comprise hollow actuator member contact surface to be contacted by the hollow actuator member when the hollow actuator member and the hollow contact member are moved with respect to each other thereby enabling the adjacent segments to be separated farther apart from each other.

10. The pipetting device positioning system according to claim 5, wherein the contact member/actuator member stop is located at a position that enables the hollow contact member and the hollow actuator member to be moved with respect to each other to a minimum extent that is sufficient to create a contact-free passage for the pipette nozzle through the cap.

11. The pipetting device positioning system according to claim 5, wherein the bottom of the liquid container has a tapered or recessed shape having reduced cross-section with respect to an average cross-section of the longitudinal body.

12. The pipetting device positioning system according to claim 5, wherein the contact member/pipette nozzle stop is located at a position that enables the pipette nozzle to be positioned at a lowermost position within a pre-defined tolerance range of distance from the bottom of the liquid container.

13. The pipetting device positioning system according to claim 5, wherein the controller is configured to control the driving unit such as to position the pipette nozzle to any desired distance from the bottom of the liquid container based on relative position of the pipette nozzle with respect to the hollow contact member when the hollow contact member contacts the liquid container.

14. The pipetting device positioning system according to claim 5, wherein the liquid container comprises a seal configured to be broken when the hollow contact member and the hollow actuator member are moved with respect to each other or when the hollow actuator member and the pipette nozzle are moved with respect to each other.

15. An in-vitro diagnostic system, the in-vitro diagnostic system comprising:
the pipetting device positioning system according to claim 5.

* * * * *